United States Patent
Hu et al.

(10) Patent No.: US 10,249,334 B1
(45) Date of Patent: Apr. 2, 2019

(54) SLIDER AIR-BEARING SURFACE DESIGNS WITH SIDE PARTICLE-TRAPPING STRUCTURES

(71) Applicant: Western Digital Technologies, Inc., San Jose, CA (US)

(72) Inventors: Yong Hu, San Ramon, CA (US); Weidong Huang, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/908,711

(22) Filed: Feb. 28, 2018

(51) Int. Cl.
*G11B 5/60* (2006.01)
*G11B 5/40* (2006.01)

(52) U.S. Cl.
CPC ............. *G11B 5/6082* (2013.01); *G11B 5/40* (2013.01)

(58) Field of Classification Search
CPC ............ G11B 5/60; G11B 5/6082; G11B 5/40
USPC ............................................... 360/236–236.8
See application file for complete search history.

(56) References Cited

U.S. PATENT DOCUMENTS

| | | | |
|---|---|---|---|
| 5,490,025 A | 2/1996 | Dorius et al. | |
| 5,751,517 A | 5/1998 | Agarwal | |
| 6,055,127 A | 4/2000 | Boutaghou et al. | |
| 6,226,859 B1 | 5/2001 | Dorius et al. | |
| 6,233,118 B1 | 5/2001 | Boutaghou et al. | |
| 6,594,113 B2 | 7/2003 | Rao et al. | |
| 6,744,601 B2 | 6/2004 | Brand et al. | |
| 6,920,015 B2 | 7/2005 | Mundt et al. | |
| 7,515,384 B2 | 4/2009 | Huang | |
| 7,760,468 B2 | 7/2010 | Cha et al. | |
| 8,077,559 B1 * | 12/2011 | Miyauchi | G02B 5/008 369/112.27 |
| 8,164,860 B1 * | 4/2012 | Ambekar | G11B 5/6082 360/236.2 |
| 8,264,794 B2 | 9/2012 | Hanyu | |
| 8,493,688 B2 | 7/2013 | Ambekar et al. | |
| 8,593,763 B2 | 11/2013 | Scheppers et al. | |
| 9,190,089 B1 | 11/2015 | Zhang | |
| 9,190,090 B1 | 11/2015 | Zhang et al. | |
| 9,230,587 B1 * | 1/2016 | Hu | G11B 5/6082 |
| 9,449,630 B2 | 9/2016 | Rajasekharan et al. | |

(Continued)

OTHER PUBLICATIONS

J. L. Brand, M. Roy, and A.D. Frenz, "Designing, Modeling, and Testing Particle Robust Air Bearings for Perpendicular Recording Media," in Asia-Pacific Magnetic Recording Conference, 2006.

*Primary Examiner* — Allen T Cao

(57) ABSTRACT

Disclosed herein are sliders with particle-trapping structures for trapping particles that could otherwise adversely affect the performance of a data storage device, and data storage devices comprising such sliders. A slider includes a leading edge, a trailing edge, a leading-edge structure located between the leading edge and the trailing edge, a vertical structure located between the leading-edge structure and the trailing edge, and a particle-trapping structure adjacent to the base of the vertical structure. The vertical structure has a leading-edge-facing surface, a side-edge-facing surface, and a base at a first level of an air-bearing surface (ABS) of the slider. The particle-trapping structure has a first portion adjacent to the leading-edge-facing surface and a second portion adjacent to the side-edge-facing surface. The particle-trapping structure comprises at least one cavity extending below the first level when the ABS is oriented upward.

22 Claims, 11 Drawing Sheets

(56) References Cited

U.S. PATENT DOCUMENTS

| | | | |
|---|---|---|---|
| 9,911,444 B1* | 3/2018 | Yamane | G11B 5/6082 |
| 9,940,960 B2 | 4/2018 | Cha et al. | |
| 2003/0169535 A1* | 9/2003 | Boutaghou | G11B 5/6005 |
| | | | 360/236.5 |
| 2005/0099932 A1 | 5/2005 | Yanagisawa | |
| 2005/0213252 A1* | 9/2005 | Park | G11B 5/6082 |
| | | | 360/236.3 |
| 2007/0206326 A1* | 9/2007 | Zhang | G11B 5/6005 |
| | | | 360/236.3 |
| 2010/0103560 A1 | 4/2010 | Imamura et al. | |
| 2010/0149693 A1 | 6/2010 | Ooeda et al. | |
| 2010/0202085 A1 | 8/2010 | Ishii et al. | |
| 2011/0195275 A1* | 8/2011 | Huha | G11B 5/255 |
| | | | 428/815.1 |
| 2012/0050918 A1* | 3/2012 | Ambekar | G11B 5/6082 |
| | | | 360/235.4 |
| 2012/0229933 A1 | 9/2012 | Ma et al. | |

\* cited by examiner

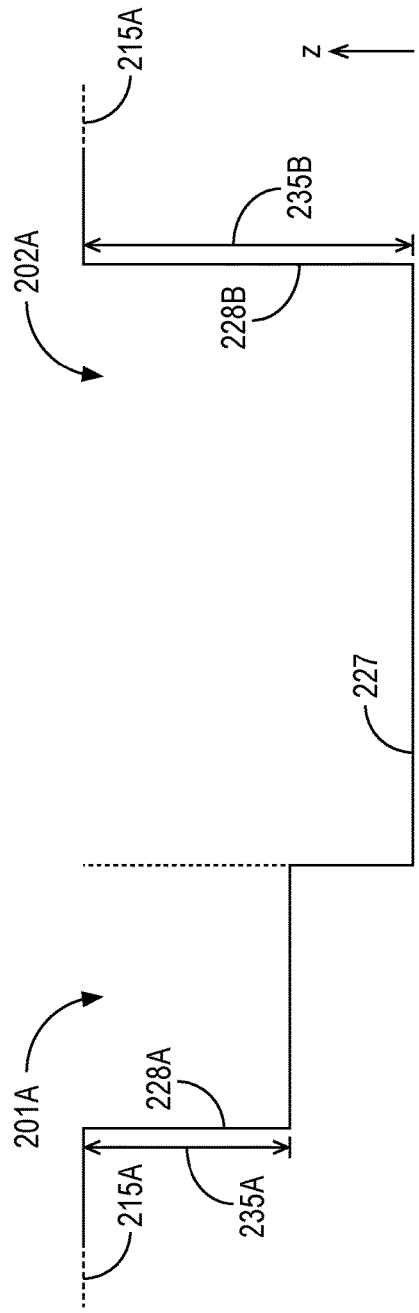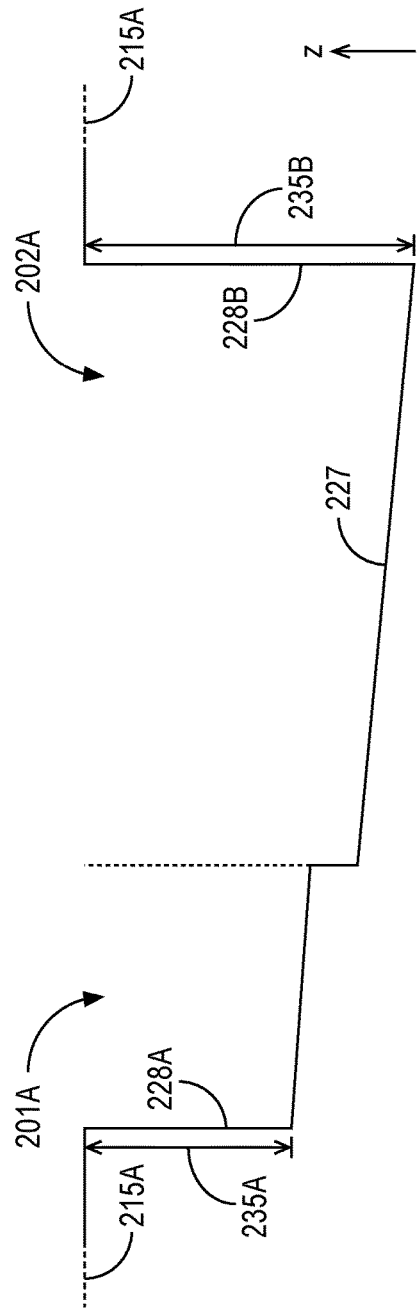

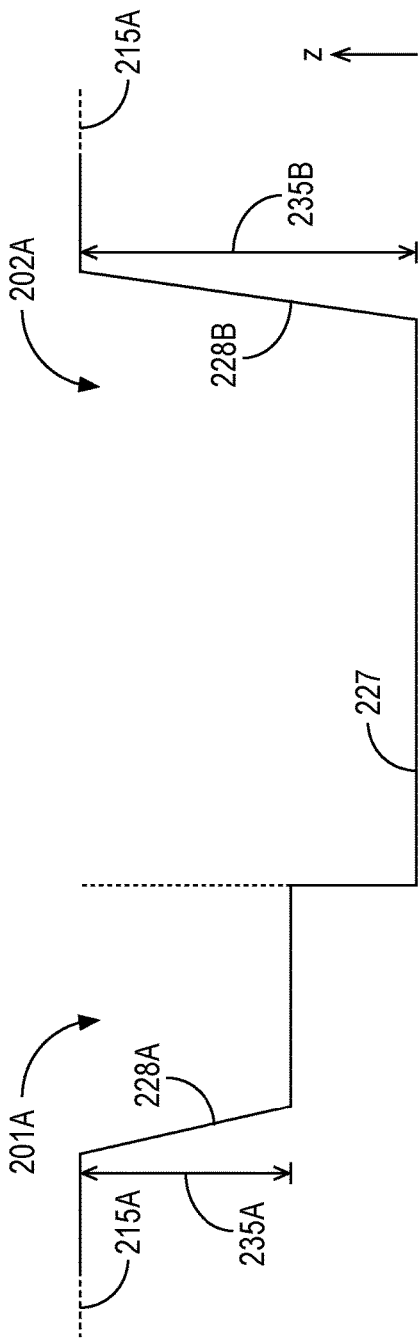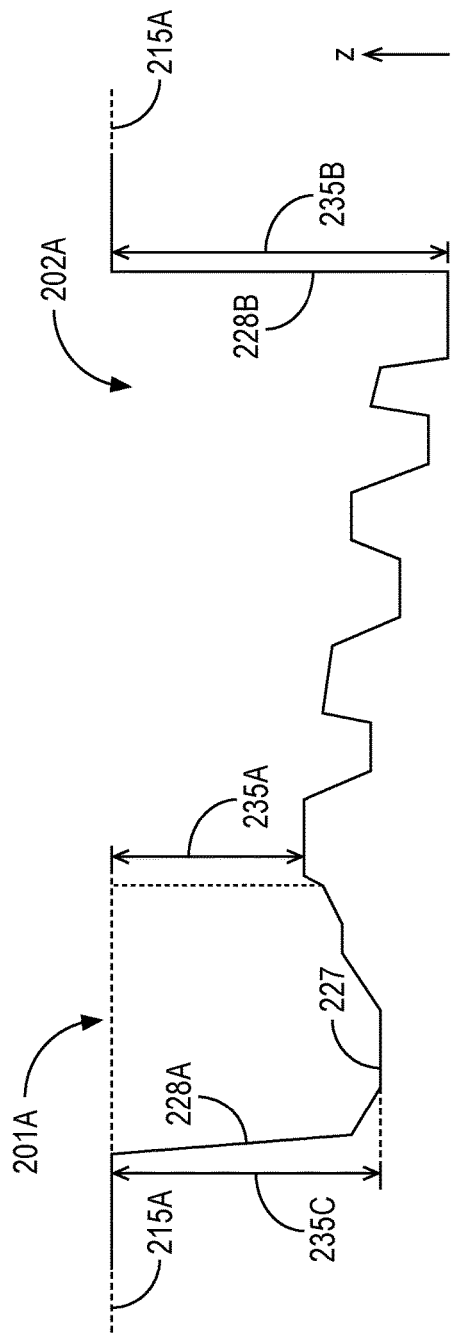

SLIDER AIR-BEARING SURFACE DESIGNS WITH SIDE PARTICLE-TRAPPING STRUCTURES

CROSS-REFERENCE TO RELATED APPLICATIONS

This application is being filed on the same day as, and hereby incorporates by reference for all purposes the entirety of, U.S. patent application Ser. No. 15/908,685, entitled "SLIDER AIR-BEARING SURFACE DESIGNS WITH SEGMENTED PARTICLE-TRAPPING STRUCTURES," and having inventors Yong Hu and Weidong Huang.

BACKGROUND

Data storage systems are used to store large amounts of information. A data storage system typically includes a read/write head for retrieving and storing information. Some data storage systems use rotating storage devices, such as rotating optical devices (e.g., CD and DVD drives) or hard disk drives containing rotating magnetic disks (also referred to as platters or media). In some such data storage systems, a suspended slider supports the head. The slider provides mechanical support for the head and the electrical connections between the head and the rest of the data storage system.

When the data storage system is in operation, the recording medium (e.g., a hard disk in a hard disk drive) rotates at high speeds, and the slider floats a small distance above the recording medium. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface that faces the medium. The air-bearing surface is designed to generate an air-bearing force that counteracts a preload bias that pushes the slider toward the medium. The air-bearing force causes the slider to fly above and out of contact with the medium.

To improve the areal density capacity of a data storage system, it is desirable to reduce the distance between the slider and the recording medium. As the distance between the slider and recording medium decreases, however, the data storage system becomes more susceptible to the effects of contaminants, such as particulate matter and/or lubricant droplets that can become trapped between the air-bearing surface and the medium. These and other contaminants, generally referred to herein as particles, can scratch or otherwise damage the medium.

Thus, there is an ongoing need for slider designs that improve robustness to particles.

SUMMARY

Disclosed herein are novel slider designs and data storage devices comprising sliders embodying the novel designs. The new designs improve particle robustness while maintaining adequate pitch stiffness.

In some embodiments, a slider comprises a leading edge, a trailing edge, a leading-edge structure located between the leading edge and the trailing edge, a vertical structure located between the leading-edge structure and the trailing edge, and a particle-trapping structure adjacent to the base of the vertical structure. The vertical structure has a leading-edge-facing surface, a side-edge-facing surface, and a base at a first level of the ABS of the slider. The particle-trapping structure has a first portion adjacent to the leading-edge-facing surface and a second portion adjacent to the side-edge-facing surface, wherein the particle-trapping structure comprises at least one cavity extending below the first level when the ABS is oriented upward.

In some embodiments, the particle-trapping structure abuts the base of the vertical structure. In some embodiments, the particle-trapping structure is offset from the base of the vertical structure.

In some embodiments, the first portion and the second portion intersect. In some embodiments, a depth of the first portion differs from a depth of the second portion. In some embodiments, a depth of the first portion is substantially the same as a depth of the second portion.

In some embodiments, a footprint of the particle-trapping structure is L-shaped.

In some embodiments, a floor of the particle-trapping structure is non-uniform. In some embodiments, at least a portion of a floor of the particle-trapping structure is substantially flat.

In some embodiments, the vertical structure is a side pad.

In some embodiments, the particle-trapping structure is a first particle-trapping structure, and the at least one cavity is a first at least one cavity, and the slider further comprises a second particle-trapping structure adjacent to a base of the leading-edge structure, wherein the second particle-trapping structure comprises a second at least one cavity extending below the first level. In some such embodiments, a depth of the first particle-trapping structure and a depth of the second particle-trapping structure are substantially identical. In other such embodiments, a depth of the first particle-trapping structure differs from a depth of the second particle-trapping structure. In some embodiments, the second particle-trapping structure comprises a segmented structure.

In some embodiments, the slider comprises a second particle-trapping structure adjacent to a base of a second vertical structure. In some such embodiments, the second vertical structure is located between the leading-edge structure and the trailing edge. In some embodiments, the depths of the particle-trapping structures are substantially identical. In other embodiments, the depths of the particle-trapping structures differ. In some embodiments, the footprints of the particle-trapping structures are substantially similar. In other embodiments, the footprints of the particle-trapping structures differ.

In some embodiments, the particle-trapping structure comprises a segmented structure comprising at least a first particle trapping segment, a second particle-trapping segment, and a gap disposed between the first and second particle-trapping segments. In some such embodiments, when the ABS of the slider is oriented upward, a level of the first particle-trapping segment is below the first level, a level of the second particle-trapping segment is below the first level, a level of the gap is at or below the first level, and the level of the first particle-trapping segment and the level of the second particle-trapping segment are below the level of the gap.

BRIEF DESCRIPTION OF THE DRAWINGS

The disclosure herein is illustrated by way of example, and not by way of limitation, in the figures of the accompanying drawings, in which like reference numerals refer to similar elements and in which:

FIG. 5D illustrates another exemplary embodiment of the particle-trapping structure of FIG. 5B.

FIG. 5E illustrates another exemplary embodiment of the particle-trapping structure of FIG. 5B.

FIG. 5F illustrates another exemplary embodiment of the particle-trapping structure of FIG. 5B.

FIG. 5G illustrates another exemplary embodiment of the particle-trapping structure of FIG. 5B.

DETAILED DESCRIPTION

The following description is made for the purpose of illustrating the general principles of the present disclosure and is not meant to limit the inventive concepts claimed herein. Furthermore, particular embodiments and/or features described herein may be used in combination with other described embodiments and/or features in various possible combinations and permutations.

Figure 1:
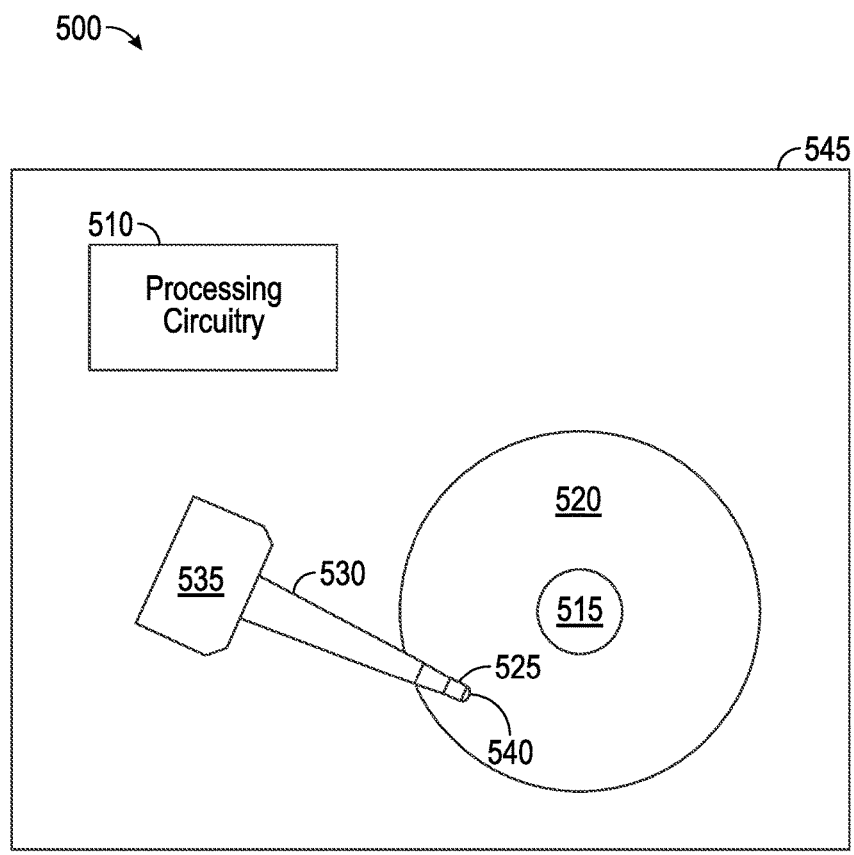
FIG. 1 illustrates several components of an exemplary data storage device that may incorporate various of the disclosed embodiments.

FIG. 1 illustrates several components of an exemplary data storage device, namely a magnetic hard disk drive 500, that may include some of the embodiments disclosed herein. The hard disk drive 500 includes a spindle 515 that supports and rotates a magnetic disk 520. The spindle 515 is rotated by a spindle motor (not shown) that is controlled by a motor controller (not shown) that may be implemented in electronics of the hard disk drive 500. A slider 525, which is supported by a suspension and actuator arm 530, has a combined read and write magnetic head 540. The head 540 may include only one read sensor, or it may include multiple read sensors. The read sensors in the head 540 may include, for example, one or more giant magnetoresistance (GMR) sensors, tunneling magnetoresistance (TMR) sensors, or another type of magnetoresistive sensor. An actuator 535 rotatably positions the suspension and actuator arm 530 over the magnetic disk 520. The components of the hard disk drive 500 may be mounted on a housing 545. It is to be understood that although FIG. 1 illustrates a single disk 520, a single slider 525, a single head 540, and a single suspension and actuator arm 530, the hard disk drive 500 may include a plurality (i.e., more than one) of disks 520, sliders 525, heads 540, and suspension and actuator arms 530.

In operation, the actuator 535 moves the suspension and actuator arm 530 to position the slider 525 so that the magnetic head 540 is in a transducing relationship with the surface of the magnetic disk 520. When the spindle motor rotates the disk 520, the slider 525 is supported on a thin cushion of air known as the air bearing that exists between the surface of the disk 520 and an air-bearing surface of the slider 525.

The head 540 may be used to write information to multiple tracks on the surface of the disk 520 and to read previously-recorded information from the tracks on the surface of the disk 520. Processing circuitry 510 provides to the head 540 signals representing information to be written to the disk 520 and receives from the head 540 signals representing information read from the disk 520. The processing circuitry 510 also provides signals to the spindle motor to rotate the magnetic disk 520, and to the actuator 535 to move the slider 525 to various tracks. To read information from the magnetic disk 520, the slider 525 passes over a region of the disk 520, and the head 540 detects changes in resistance due to magnetic field variations recorded on the disk 520, which represent the recorded bits.

The slider 525 has a gas-bearing surface that faces the surface of the disk 520 and counteracts a preload bias that pushes the slider toward the disk 520. For convenience, in this document the gas-bearing surface is referred to as the air-bearing surface (ABS) and the gas is generally referred to as "air," although it is to be understood that the gas used in a hard disk drive 500 may be a gas other than air (e.g., the gas may be helium in a sealed helium hard disk drive 500). For simplicity, throughout this disclosure, the surface of the slider 525 that faces or that will eventually face the disk 520 is referred to as the ABS.

As the disk 520 rotates, the disk 520 drags air under the slider 525 and along the ABS in a direction approximately parallel to the tangential velocity of the disk 520. As the air passes under the ABS, air compression along the air flow path causes the air pressure between the disk 520 and the ABS to increase, which creates a hydrodynamic lifting force that counteracts the tendency of the suspension and actuator arm 530 to push the slider 525 toward the disk 520. The slider 525 thus flies above the disk 520 but in close proximity to the surface of the disk 520.

To obtain good performance, it is desirable for the slider 525 to maintain a substantially constant flying height above the surface of the disk 520. The degree of stability of the fly-height of the slider 525 influences the performance of the magnetic head 540. The design of the slider 525 ABS has an impact on the flying characteristics of the slider 525 and therefore the performance of the magnetic head 540.

Figure 2:
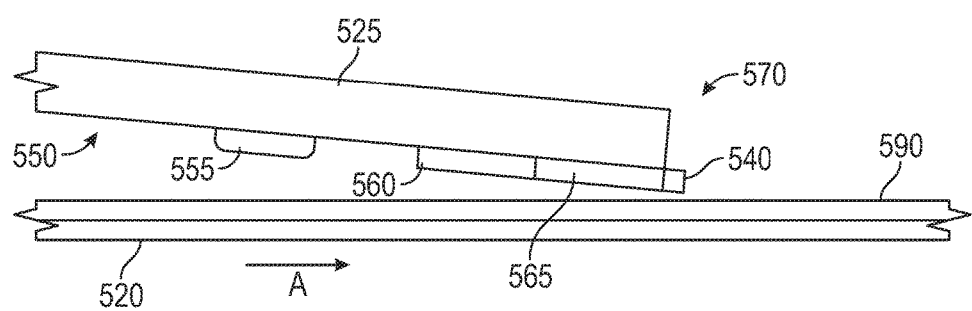
FIG. 2 is a side view of the slider and the magnetic disk of FIG. 1.

FIG. 2 is a side view of the slider 525 and the magnetic disk 520 of FIG. 1. The slider 525 may be in accordance with one or more of the embodiments disclosed herein. The magnetic disk 520 is moving in the direction of arrow A and causes airflow in the same direction. This airflow flows over the ABS 550 of the slider 525 and produces the lifting pressure described above. In some embodiments, the slider 525 includes raised areas such as a front pad 555, one or more side pads 560, and a trailing pad 565. The trailing pad 565, located adjacent to the trailing edge 570 of the slider 525, may further include the magnetic read/write head 540 that writes data to and reads data from the magnetic disk 520. The disk 520 has a lubricant 590 on its upper surface to protect the recording layer of the disk 520 from contact with the slider 525 and/or other components of the disk drive 500.

Figure 3:
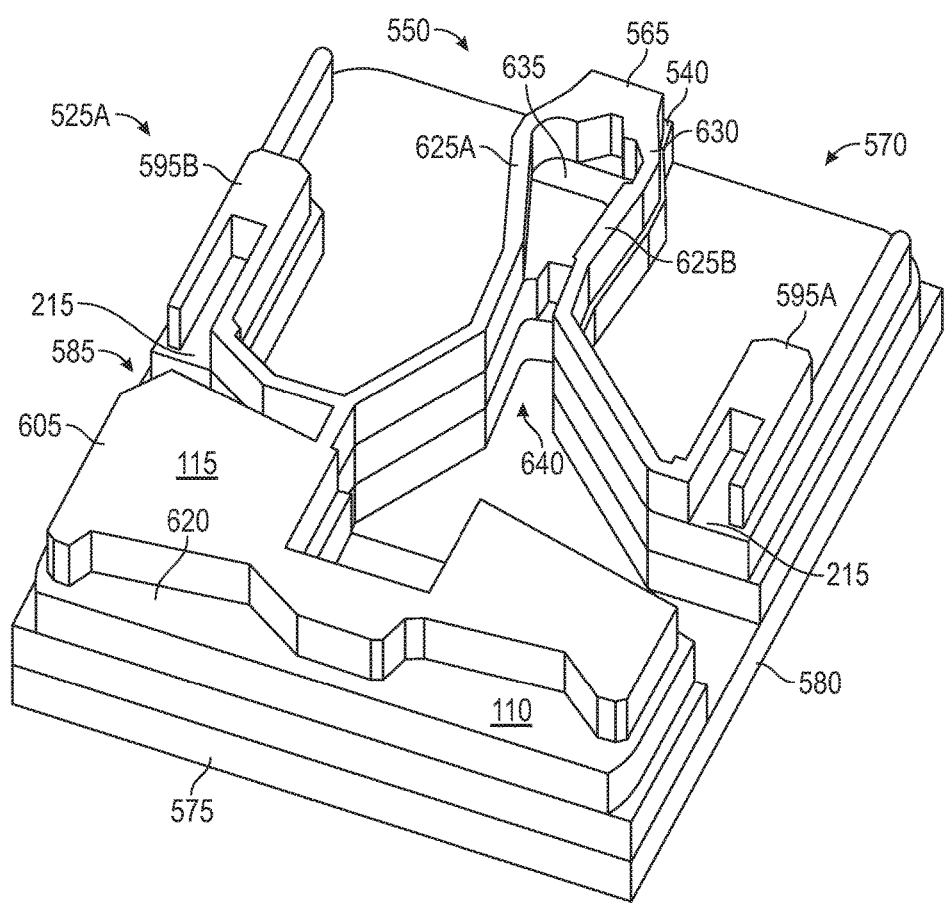
FIG. 3 is a perspective view of a conventional slider, illustrating the air-bearing surface.

FIG. 3 is a perspective view of the ABS 550 of a conventional slider 525A. The slider 525A has a leading edge 575, a trailing edge 570, a first side edge 580, a second side edge 585, and an ABS 550. A trailing pad 565 is adjacent to the trailing edge 570 of the slider 525A and, as shown, is substantially centered relative to the trailing edge 570. The first and second side pads 595A, 595B are adjacent, respectively, to the first second side edges 580, 585 of the slider 525A. As illustrated in FIG. 3, each of the first and second side pads 595A and 595B may have a substantially "U" shaped configuration, with the open part of the U facing the leading edge 575 of the slider 525A. Typically, the trailing pad 565 has a read/write head 540 mounted thereon, on the rear portion of the trailing pad 565 adjacent to the trailing edge 570 of the slider 525A.

The first and second side pads 595A, 595B are examples of what is referred to herein as a vertical structure because when the slider 525A is oriented with the ABS 550 upward, as shown in FIG. 3, the first and second side pads 595A, 595B extend upward (i.e., substantially vertically, in the z-direction) from the levels 215A 215B. In other words, each of the first and second side pads 595A, 595B has a base at, respectively, the level 215A, 215B.

Although FIG. 3 illustrates the first and second side pads 595A, 595B having an abrupt (i.e., step-function-like) rise from the levels 215A, 215B, it is to be understood that the walls of a vertical structure need not be perpendicular to the level 215 of the base. In other words, the walls of the first and second side pads 595A, 595B need not be substantially vertical when the ABS 550 faces upward. In some embodiments, the walls of the first and second side pads 595A, 595B are substantially perpendicular to the surfaces at the levels 215A, 215B, but in other embodiments, the walls of the first and second side pads 595A, 595B may not be perpendicular to the surfaces at the levels 215A, 215B.

As shown in FIG. 3, the ABS 550 also has a first leading pad 605 near the leading edge 575 of the slider 525A. The portion of the first leading pad 605 that is closest to the disk 520 when the slider 525A is installed in a hard disk drive 500 is at a level 115. The first leading pad 605 intersects a second leading pad 620 disposed between the first leading pad 605 and the leading edge 575 of the slider 525A. The portion of the second leading pad 620 that is closest to the disk 520 when the slider 525A is installed in a hard disk drive 500 is at a level 110. The second leading pad 620 is in contact with the base of the first leading pad 605.

The ABS 550 of the slider 525A in FIG. 3 also includes first and second arms 625A, 625B, which are connected to the sides of the trailing pad 565 and extend toward the leading edge 575 of the slider 525A. The trailing pad 565, the first arm 625A, and the second arm 625B together form a tail section 630 of the trailing portion 635 of the slider 525A. A longitudinal channel 640 is between the first and second arms 625A, 625B. In the example slider 525A of FIG. 3, the first and second arms 625A, 625B connect the first 595A and second 595B side pads, respectively, to the trailing pad 565. The portions of the first and second arms 625A, 625B closest to the trailing pad 565 extend toward the leading edge 575 of the slider 525A. As the first and second arms 625A, 625B extend further from the trailing pad 565, the first and second arms 625A, 625B form an arc toward the first side edge 580 and the second side edge 585 of the slider 525A and connect to the inner top portion of the U-shaped side pads 595A and 595B, respectively.

In hard disk drives, particles tend to build up at the leading edge surface of the slider 525, particularly in areas close to the step to the surface 115 (e.g., level 110 of the second leading pad 620). These particles may touch the disk 520, which can result in damage to the disk 520. Some types of particles (e.g., harder particles such as diamond, alumina, TiC, etc.) are likely to scratch the disk 520 if they touch it. Other types of particles (e.g., softer particles such as silicon, stainless steel, lubricant 590, etc.) are less likely to cause detectable physical damage to the disk 520, but they can still cause recorded magnetic information to be erased because of thermal and/or mechanical stress.

Particle build-up can be a significant problem for both hard disk drives that operate in air and disk drives that operate in lower-pressure-environments, such as sealed helium drives. The problem can be particularly acute for lower-pressure-environment disk drives. For example, in sealed helium hard disk drives, there is significantly less pressure gradient at the slider's trailing edge, which causes little-to-no backflow at the trailing edge. The lower pressure gradient causes particles to be less mobile, which can lead to particle build-up. Consequently, it is desirable to mitigate the deleterious effects of particles in magnetic storage devices.

Figure 4:
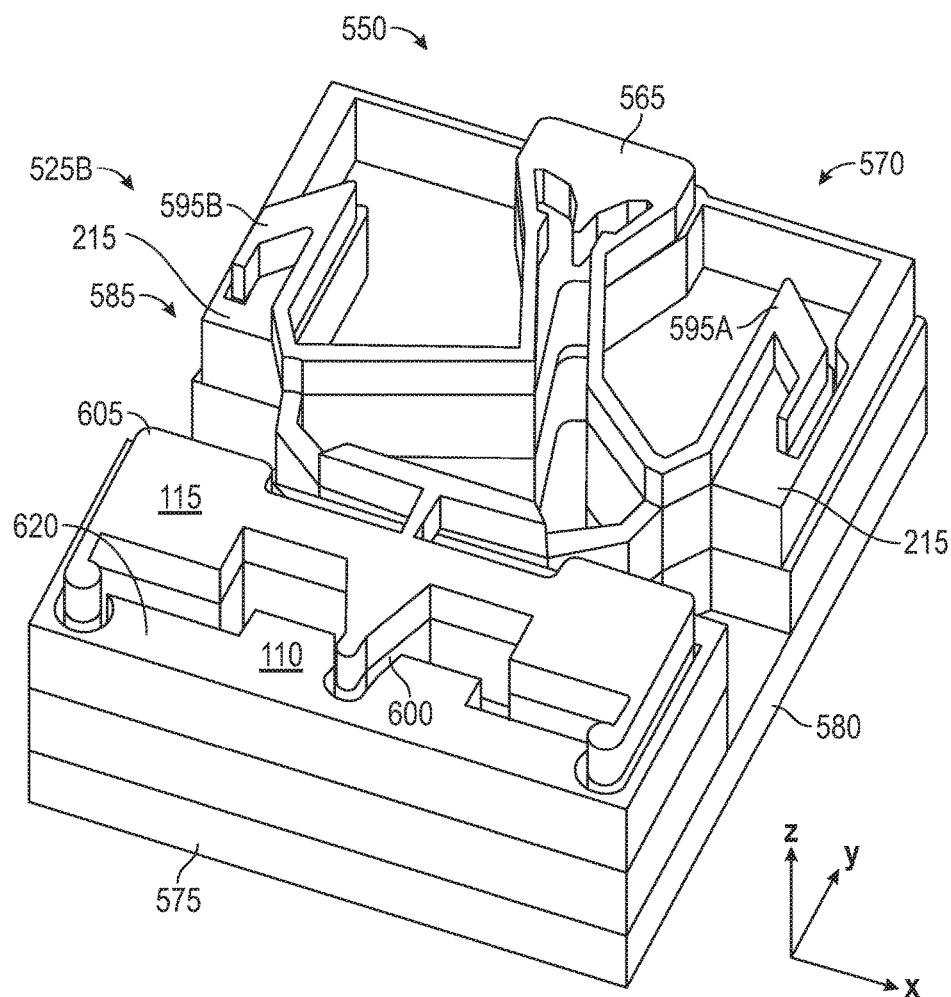
FIG. 4 illustrates a slider with a continuous particle-trapping structure near the leading edge.

U.S. Pat. No. 9,230,587, the entirety of which is hereby incorporated by reference for all purposes, discloses a continuous particle-trapping structure to collect particles that might otherwise damage the disk 520 or adversely affect the performance of a magnetic storage device. FIG. 4 illustrates a slider 525B with a continuous particle-trapping structure 600 disposed at the base of the first leading pad 605 and between the first leading pad 605 and the second leading pad 620. This design significantly improves particle robustness but may reduce the slider 525B pitch stiffness by reducing gas pressurization at the leading edge 575 of the slider 525B. The reduced gas pressurization may be problematic in some data storage devices, such as those operating in lower-pressure conditions. Moreover, particles that are not captured by the continuous particle-trapping structure 600 and can build up in areas of the slider 525 closer to the trailing edge 570, where they may be more problematic because of the reduced distance between the slider 525 and the disk 520 closer to the trailing edge 570 (see FIG. 2).

Disclosed herein are slider designs having at least one particle-trapping structure disposed adjacent to a vertical structure (e.g., a side pad 595) that is located behind a leading-edge structure (e.g., leading pad 605) in the vicinity of the trailing edge 570. Each particle-trapping structure includes at least one cavity (i.e., an unfilled (e.g., hollowed-out) space with enclosed sides) extending into the body of the slider 525, where each of the at least one cavities is below the base of the vertical structure when the slider ABS 550 faces up.

The particle-trapping structures disclosed herein differ from the additional particle trapping holes disclosed in U.S. Pat. No. 9,230,587 in at least two respects. First, the particle-trapping structures disclosed herein include a first portion adjacent to a leading-edge-facing surface of the vertical structure and a second portion adjacent to a side-edge-facing surface of the vertical structure, whereas the additional particle trapping holes of U.S. Pat. No. 9,230,587 are disposed only between a wall of the slider and a side pad. Second, the additional particle trapping holes of U.S. Pat. No. 9,230,587 do not include cavities, whereas the particle-trapping structures disclosed herein include at least one cavity below the base of the vertical structure adjacent to which they are disposed. As shown in, for example, FIG. 5B of U.S. Pat. No. 9,230,587, the elements labeled 542c and 542d are open toward the trailing edge of the slider and are therefore not unfilled spaces with enclosed sides. In contrast, the particle-trapping structures disclosed herein have at least one cavity.

Figure 5A:
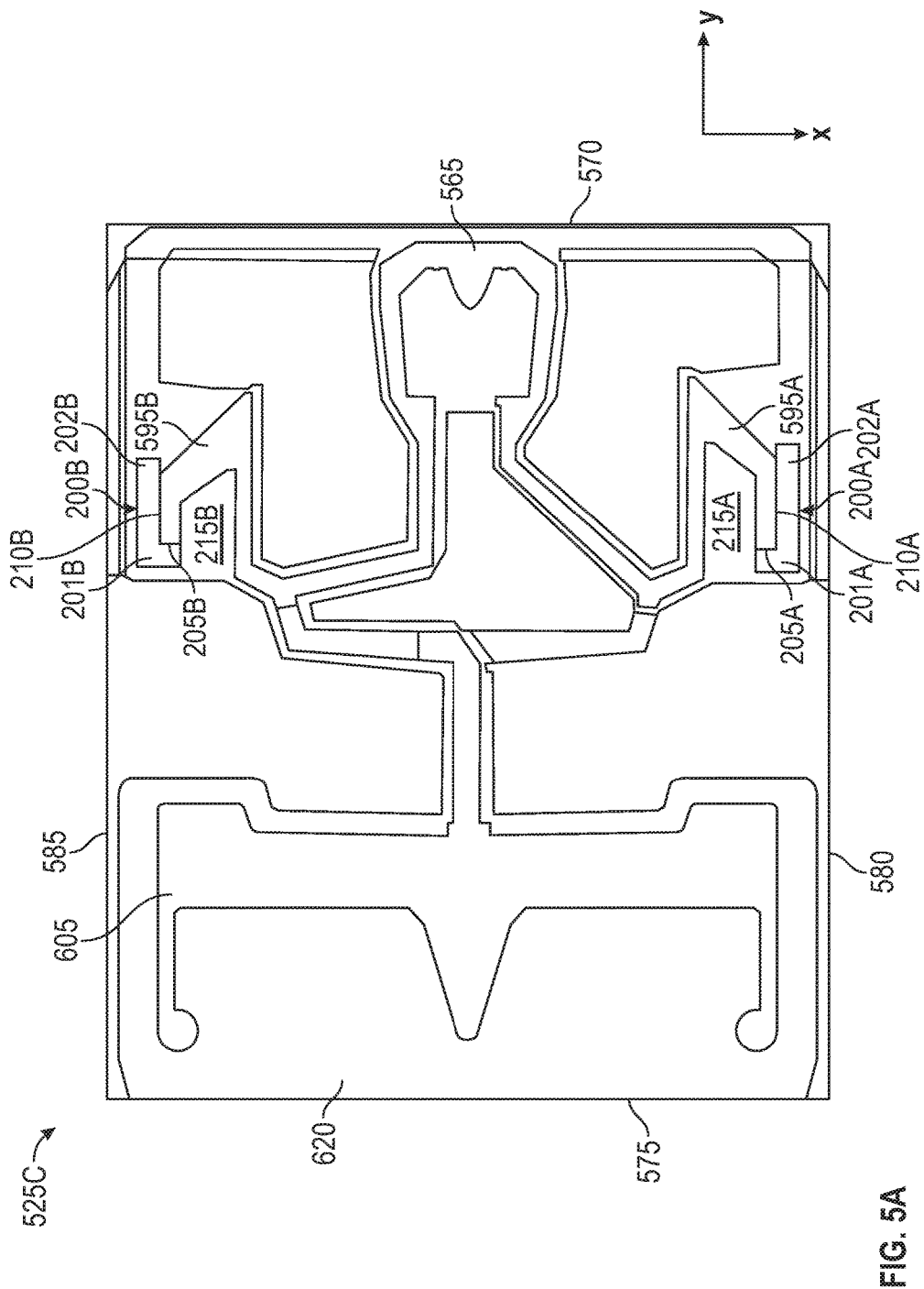
FIG. 5A is a top view of an exemplary slider that includes at least one particle-trapping structure in accordance with some embodiments.

FIG. 5A herein is a top view (x-y plane view) of a slider 525C that includes at least one particle-trapping structure 200 in accordance with some embodiments. FIG. 5A illustrates two particle-trapping structures 200A, 200B. The particle-trapping structure 200A is disposed adjacent to a vertical structure. In the embodiment illustrated in FIG. 5A, the vertical structure is the side pad 595A. The side pad 595A has a leading-edge-facing surface 205A, which faces the leading edge 575 of the slider 525C, and a side-edge-facing surface 210A, which faces the side edge 580 of the slider 525C. When the slider 525C is oriented with the ABS 550 facing upward, the side pad 595A extends upward from a base, which is at a level 215A.

A particle-trapping structure 200 is said to be adjacent to the base of a vertical structure if it is located proximate to, but is not necessarily touching (i.e., abutting), the base of the vertical structure, and its shape when viewed from above (i.e., in the x-y plane) generally follows the shape of at least a portion of the base. In general, a particle-trapping structure 200 may be touching the base of the vertical structure, or it may be offset from the base of the vertical structure. Either way, it is said to be adjacent to the base of the vertical structure.

In the embodiment illustrated in FIG. 5A, the particle-trapping structure 200A abuts the base of the side pad 595A. Specifically, the particle-trapping structure 200A touches and follows the portion of the base of the side pad 595A at the leading-edge-facing surface 205A and the portion of the base of the side pad 595A at the side-edge-facing surface 210A. Therefore, the particle-trapping structure 200A is adjacent to the base of the side pad 595A.

The particle-trapping structure 200A includes a first portion 201A, which is adjacent to the leading-edge-facing surface 205A of the side pad 595A, and a second portion 202A, which is adjacent to the side-edge-facing surface 210A of the side pad 595A. In the embodiment illustrated in FIG. 5A, the first portion 201A and second portion 202A intersect and form a single cavity. In other embodiments, the first portion 201A and second portion 202A do not intersect, and each includes its own at least one cavity. As described below, each of the one or more cavities of a particle-trapping structure 200 may have any size, shape, and characteristics that enable the particle-trapping structure 200 to provide the desired particle-trapping performance.

In addition to the particle-trapping structure 200A, the embodiment of the slider 525C shown in FIG. 5A also includes a second particle-trapping structure 200B, which abuts (and is therefore adjacent to) the base of the side pad 595B. The side pad 595B has a leading-edge-facing surface 205B, which faces the leading edge 575 of the slider 525C, and a side-edge-facing surface 210B, which faces the side edge 585 of the slider 525C. When the slider 525C is oriented with the ABS 550 facing upward, the side pad 595B extends upward from a base at a level 215B. The level 215B may be the same as or different from the level 215A. The particle-trapping structure 200B touches and follows the portion of the base of the side pad 595B at the leading-edge-facing surface 205B and the portion of the base of the side pad 595B at the side-edge-facing surface 210B. Like the particle-trapping structure 200A, the particle-trapping structure 200B includes a first portion 201B, which is adjacent to the leading-edge-facing surface 205B of the side pad 595B, and a second portion 202B, which is adjacent to the side-edge-facing surface 210B of the side pad 595B. In the embodiment illustrated in FIG. 5A, the first portion 201B and second portion 202B intersect to form a single cavity. As explained above, in other embodiments, the first portion 201B and second portion 202B do not intersect, and each includes its own at least one cavity.

A particle-trapping structure 200 may have any suitable shape (also referred to as a footprint) in the x-y plane. In the exemplary embodiment shown in FIG. 5A, each of the particle-trapping structures 200A, 200B has an L-shape in the x-y plane. In other embodiments, some or all of the particle-trapping structures 200 are not L-shaped (e.g., they may have other shapes and/or may be irregular). Likewise, different particle-trapping structures 200 of the same slider 525 can have different footprints in the x-y plane and/or different characteristics.

Each particle-trapping structure 200 has a floor 227. The floor 227, which may be level or sloped, and may be smooth or non-smooth, extends to a depth 235 below the level 215. In some embodiments, at least a portion of the floor 227 is substantially flat. In some embodiments, the entire floor 227 is substantially flat. The depth 235 of the floor 227 may vary across the surface of the floor 227. In some embodiments, the depth 235 of the floor 227 in the first portion 201 of the particle-trapping structure 200 differs from the depth 235 of the floor 227 in the second portion 202 of the particle-trapping structure 200. In some embodiments, at least a portion of the floor 227 of the particle-trapping structure 200 is non-uniform (e.g., includes cavities, crevices, protrusions, etc.). For example, the portion of the floor 227 within the first portion 201 and/or the portion of the floor 227 within the second portion 202 may be non-uniform. Similarly, within the first or second portion 201, 202, the floor 227 may have one set of characteristics in one area and a different set of characteristics in another area.

In some embodiments, a particle-trapping structure 200 also has at least one wall 228 that connects the floor 227 to the level 215. In embodiments in which the particle-trapping structure 200 also has at least one wall 228, when the ABS 550 is oriented upward, the at least one wall 228 extends downward to the floor 227. In some embodiments in which the particle-trapping structure 200 also has at least one wall 228, the transition from the floor 227 to the level 215 is substantially a step (i.e., the wall 228 is approximately vertical).

The following discussion focuses on the particle-trapping structure 200A shown in FIG. 5A. It is to be appreciated that the discussion is equally applicable to the particle-trapping structure 200B and to any other particle-trapping structures 200 that might be included in a slider 525. Moreover, it is to be understood that different particle-trapping structures 200 of the same slider 525 can have different characteristics (e.g., size, shape, dimensions, footprint in the x-y plane, features, etc.).

Figure 5B:
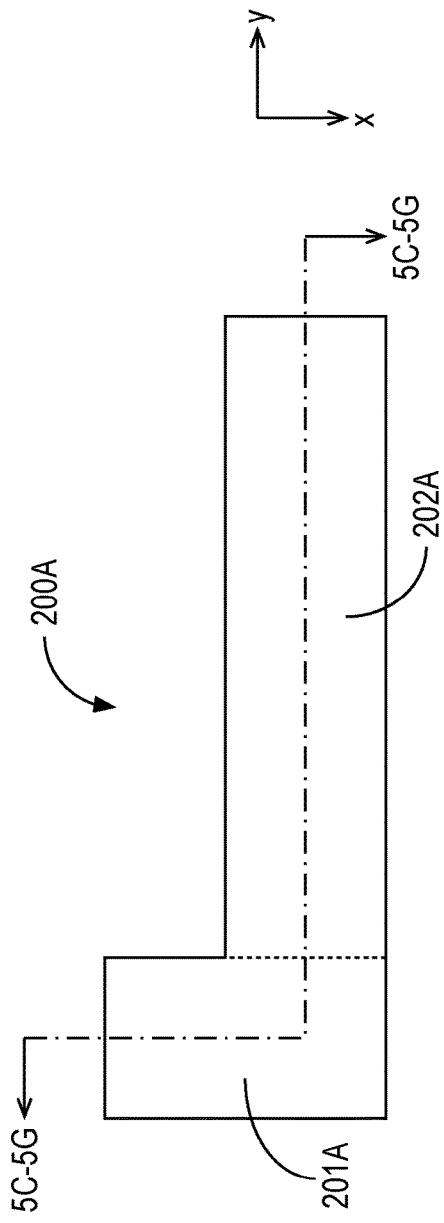
FIG. 5B is a closer view of the particle-trapping structure shown in FIG. 5A.

FIG. 5B is a closer view of the particle-trapping structure 200A. FIG. 5B includes a dotted line representing the demarcation between the first portion 201A and the second portion 202A of the particle-trapping structure 200A. As explained above, the first portion 201A of the particle-trapping structure 200A is adjacent to the leading-edge-facing surface 205A of the vertical structure (shown in FIG. 5A as the side pad 595A), and the second portion 202A of the particle-trapping structure 200A is adjacent to the side-edge-facing surface 210A of the vertical structure. Because the particle-trapping structure 200A extends away from both the leading-edge-facing surface 205A and the side-edge-facing surface 210A in the x-y plane, it will be appreciated by skilled artisans that the precise location of the demarcation between the first and second portions 201A, 202A is somewhat arbitrary (e.g., the dotted line could alternatively extend horizontally from the point where the leading-edge-facing surface 205A and the side-edge-facing surface 210A intersect or in any of myriad other directions away from that intersection). Therefore, it is to be understood that the dotted line in FIG. 5B is included only to provide a reference point for FIGS. 5C through 5G, discussed below.

In addition to the dotted line, FIG. 5B also includes a dash-dot line labeled "5C-5G." To illustrate various characteristics of the particle-trapping structure 200, FIGS. 5C through 5G illustrate exemplary cross-sections of the particle-trapping structure 200 taken parallel to the z-axis along the path represented by the dash-dot line. Because the path taken by the dash-dot line is not in any single direction in the x-y plane (e.g., it is not entirely in either the x-direction or the y-direction), FIGS. 5C through 5G show only the direction of the z-axis. Consequently, FIGS. 5C through 5G are "flattened" representations of cross-sections of the particle-trapping structure 200A. In other words, FIGS. 5C through 5G are two-dimensional representations of the cross-section of the particle-trapping structure 200A along the path represented by the dash-dot line.

Figure 5C:
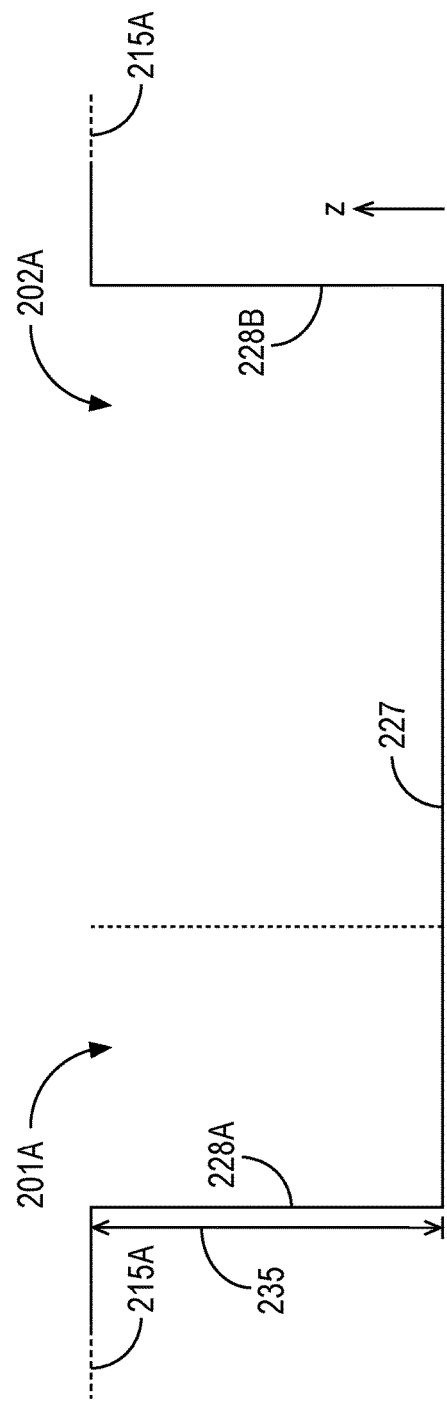
FIG. 5C illustrates an exemplary embodiment of the particle-trapping structure of FIG. 5B.

FIG. 5C illustrates an exemplary embodiment of the particle-trapping structure 200A along the dash-dot line shown in FIG. 5B. In the embodiment shown in FIG. 5C, the particle-trapping structure 200A has a substantially flat, uniform, smooth floor 227 and substantially vertical walls 228A, 228B connecting the floor 227 to the level 215A at the ends of the particle-trapping structure 200A. Along the entire length of the dash-dot line (and in both the first portion 201A and the second portion 202A of the particle-trapping structure 200A), the floor 227 extends to a level 235, which is below the level 215A.

FIG. 5D illustrates another exemplary embodiment of the particle-trapping structure 200A along the dash-dot line shown in FIG. 5B. In the embodiment shown in FIG. 5D, the floor 227 of the particle-trapping structure 200A is substantially flat, uniform, and smooth within the first portion 201A of the particle-trapping structure 200A. Within the first portion 201A, the floor 227 is at a depth 235A below the level 215A. The floor 227 is also substantially flat, uniform, and smooth within the second portion 202A of the particle-trapping structure 200A. Within the second portion 202A, the floor 227 is at a depth 235B below the level 215A, where the depth 235B is greater than the depth 235A. It is to be understood that the depth 235B may alternatively be less than the depth 235A. Between the first portion 201A and the second portion 202A, the floor 227 has a steep drop-off. As in the embodiment of FIG. 5C, the exemplary embodiment in FIG. 5D has substantially vertical walls 228A, 228B connecting the floor 227 to the level 215A at the ends of the particle-trapping structure 200A.

FIG. 5E illustrates another exemplary embodiment of the particle-trapping structure 200A along the dash-dot line shown in FIG. 5B. In the embodiment shown in FIG. 5E, the floor 227 of the particle-trapping structure 200A is sloped within both portions 201A, 202A of the particle-trapping structure 200A. Within the first portion 201A, the floor 227 slopes downward from a minimum depth 235A below the level 215A. Within the second portion 202A, the floor 227 also slopes downward to a maximum depth 235B below the level 215A. In FIG. 5E, the depth 235B is greater than the depth 235A, but it is to be understood that the depth 235B may alternatively be less than the depth 235A. Between the first portion 201A and the second portion 202A, the floor 227 has a steep drop-off. As in the embodiments of FIGS. 5C and 5D, the exemplary embodiment in FIG. 5E has substantially vertical walls 228A, 228B connecting the floor 227 to the level 215A at the ends of the particle-trapping structure 200A.

Although FIGS. 5D and 5E illustrate a steep, step-like drop-off between the first portion 201A and the second portion 202A of the particle-trapping structure 200A, it is to be understood that the transition may be more gradual (e.g., sloped), or there may be no discernible transition at all (e.g., the floor 227 may have a continuous slope across wherever the boundary between the first and second portions 201A, 202A is presumed to be). Likewise, and as explained above, the boundary between the first portion 201A and the second portion 202A is, in many embodiments, somewhat arbitrary. It is to be understood that in some particle-trapping structure 200 embodiments, there is no discernible transition between the first portion 201 and the second portion 202. For such embodiments, the references herein to the first portion 201 and second portion 202 are merely for convenience of description.

FIG. 5F illustrates another exemplary embodiment of the particle-trapping structure 200A along the dash-dot line shown in FIG. 5B. In the embodiment shown in FIG. 5F, and similarly to the embodiment of FIG. 5D, the floor 227 of the particle-trapping structure 200A is substantially flat, uniform, and smooth within the first portion 201A of the particle-trapping structure 200A, and it is also substantially flat, uniform, and smooth within the second portion 202A. Within the first portion 201A, the floor 227 is at a depth 235A below the level 215A, and within the second portion 202A, the floor 227 is at a depth 235B below the level 215A, where the depth 235B is greater than the depth 235A. It is to be understood that the depth 235B may alternatively be less than the depth 235A. It is also to be understood that the floor 227 may be sloped in one or both of the first and second portions 201A, 202A (e.g., as shown in FIG. 5E). Unlike in the embodiment of FIG. 5D, the exemplary embodiment in FIG. 5F has sloped, but flat and smooth, walls 228A, 228B connecting the floor 227 to the level 215A at the ends of the particle-trapping structure 200A.

FIGS. 5C through 5F illustrate particle-trapping structures 200A with substantially smooth and uniform floors 227 (e.g., either horizontal (flat) or sloped floors 227). In general, the floor 227 of any particle-trapping structure 200 may vary in a non-linear and/or non-monotonic manner over some or all of the particle-trapping structure 200. For example, the floor 227 of a particle-trapping structure 200 may be non-uniform (e.g., it may have discontinuities, it may be non-smooth, it may include one or more crevices, cavities, protrusions, or other features that are not present in a particle-trapping structure 200 that has a level, flat floor 227, etc.). Similarly, because the floor 227 is a surface, it may have different characteristics at different locations of its surface.

In some embodiments, the floor 227 of a particle-trapping structure 200 is non-uniform (e.g., the floor 227 includes one or more cavities, crevices, protrusions, etc.). FIG. 5G illustrates another exemplary embodiment of the particle-trapping structure 200A along the dash-dot line shown in FIG. 5B. In the embodiment shown in FIG. 5E, the floor 227 of the particle-trapping structure 200A is non-uniform within both portions 201A, 202A of the particle-trapping structure 200A. Within the first portion 201A, the floor 227 includes a valley that extends to a depth 235C, which is below the minimum depth 235A of the portion of the floor 227 represented by FIG. 5G. Within the second portion 202A, the floor 227 includes several crevices that extend to various depths. The deepest crevice extends to a depth 235B below the level 215A. The depth 235B also happens to be the maximum depth of the floor 227 below the level 215A. In FIG. 5G, the depth 235B is greater than the depth 235C, but it is to be understood that the depth 235B may alternatively be less than the depth 235C. FIG. 5G also illustrates that the floor 227 need not have a discontinuity across the border between the first portion 201A and the second portion 202A (i.e., there may be no distinctive demarcation between the first portion 201A and the second portion 202A). As in the embodiments of FIGS. 5C through 5E, the exemplary embodiment in FIG. 5G has substantially vertical walls 228A, 228B connecting the floor 227 to the level 215A at the ends of the particle-trapping structure 200A.

FIGS. 5C through 5G illustrate substantially smooth walls 228. It is to be understood that the walls 228, if present, may include features and characteristics similar or identical to those described for the floor 227. For example, a wall 228 may include cavities, crevices, protrusions, etc. As another example, a wall 228 may have a first slope over a first portion of its length and a second slope over a second portion of its length. Likewise, in embodiments having at least two walls 228, the different walls 228 may have different characteristics (e.g., slopes, cavities, crevices, protrusions, etc.). Co-pending U.S. patent application Ser. No. 15/908,685 describes the types of features that may be included in the walls of the particle-trapping segments of a segmented structure; these same features may be included in the walls 228 of particle-trapping structures 200.

It is to be understood that the placement of the dash-dot line shown in FIG. 5B is arbitrary, and that the dash-dot line is included solely to enable a discussion of the characteristics of particle-trapping structures 200. The discussion above is generally applicable to all portions of particle-trapping structures 200.

In some embodiments having two or more particle-trapping structures 200, at least two of the particle-trapping structures 200 are substantially identical in one or more respects. For example, two particle-trapping structures 200 may have, for example, similar or identical footprints in the x-y plane (e.g., the footprint of a first particle-trapping structure 200 may be a mirror image, rotation, scaled version, etc. of the footprint of a second particle-trapping structure 200), similar or identical shapes (e.g., a first particle-trapping structure 200 may be a mirror image, rotation, scaled version, etc. of a second particle-trapping structure 200), similar or identical dimensions (e.g., the dimensions of a first particle-trapping structure 200 may be proportional or identical to the dimensions of a second particle-trapping structure 200), similar or identical floors 227 (e.g., the floor 227 of a first particle-trapping structure 200 may be identical to or have the same kinds of features as the floor 227 of a second particle-trapping structure 200), similar or identical depths 235 (e.g., at corresponding locations or over the entirety of their floors 227), or similar or identical walls 228 (e.g., a wall 228 of a first particle-trapping structure 200 may be identical to or have the same kinds of features as a wall 228 of a second particle-trapping structure 200).

In some embodiments, a depth 235 of the particle-trapping structure 200B is substantially identical to a depth 235 of the particle-trapping structure 200A (e.g., the depth 235 of the particle-trapping structure 200B at a particular location along the floor 227 is substantially the same as the depth 235 of the particle-trapping structure 200A at the corresponding location along the floor 227, or the maximum depth 235 of entire floor 227 of the particle-trapping structure 200B is substantially the same as the maximum depth 235 of entire floor 227 of the particle-trapping structure 200A, or the surface of at least a portion the floor 227 of the particle-trapping structure 200A is substantially identical to the surface of at least a portion of the floor 227 of the particle-trapping structure 200B, etc.).

Figure 6:
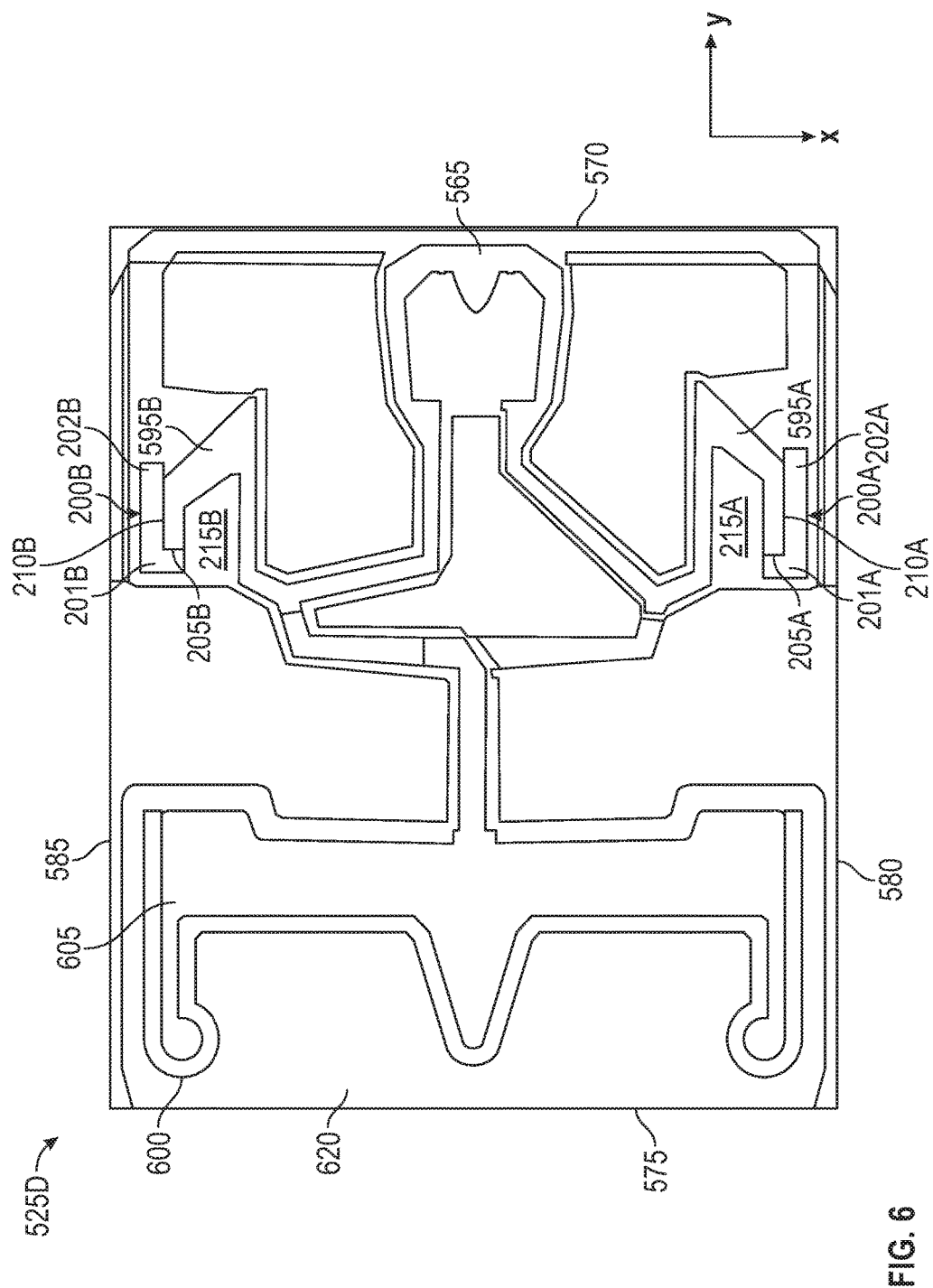
FIG. 6 illustrates a slider that includes at least one particle-trapping structure and a continuous particle-trapping structure in accordance with some embodiments.

One or more of the particle-trapping structures 200 disclosed herein can be used in conjunction with other particle-mitigation strategies. For example, FIG. 6 illustrates an exemplary slider 525D that includes particle-trapping structures 200A and 200B as well as a continuous particle-trapping structure 600 disposed near the leading edge 575 as described in U.S. Pat. No. 9,230,587 and illustrated in FIG. 4 herein.

Figure 7:
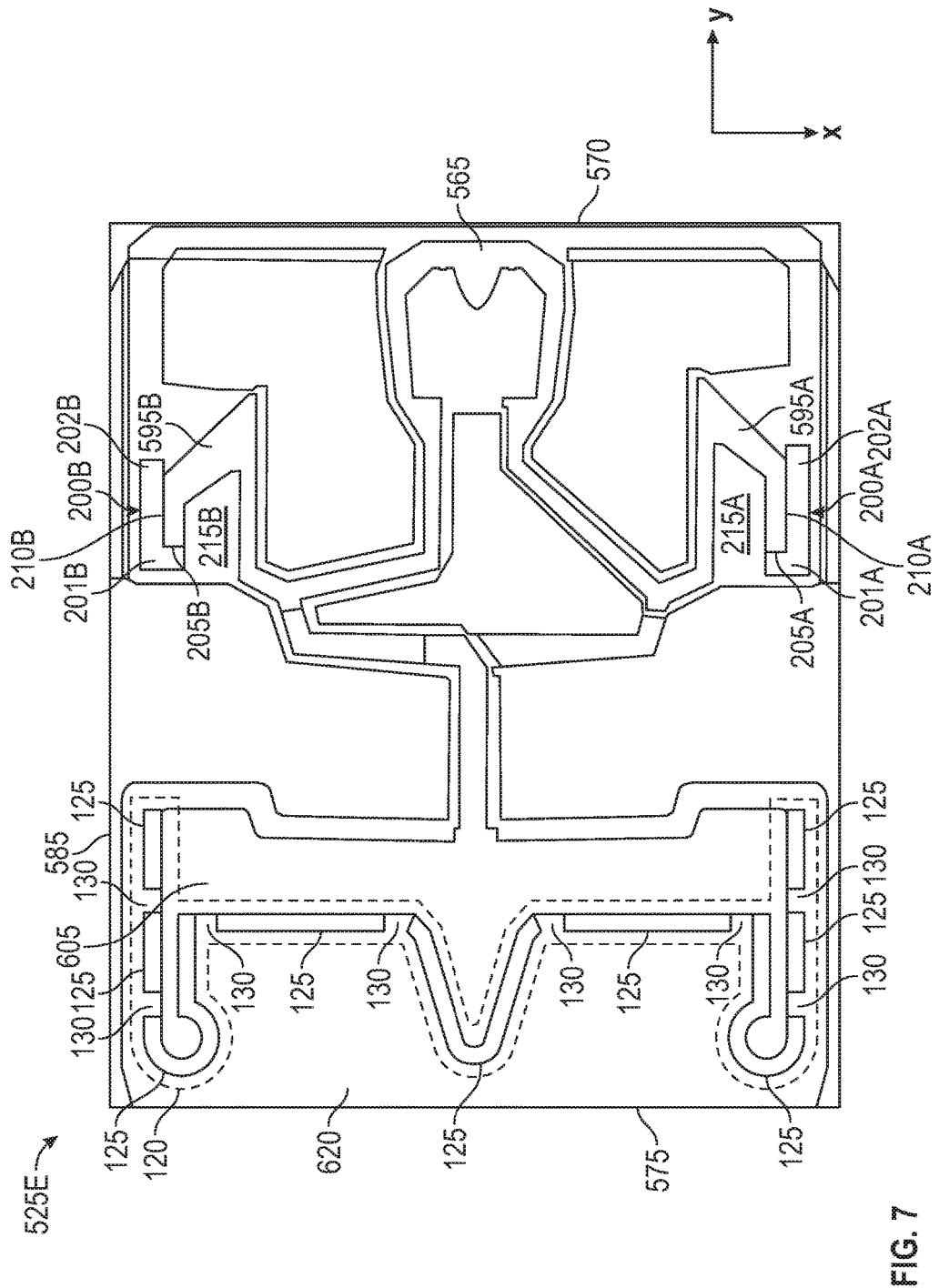
FIG. 7 illustrates a slider that includes a segmented structure and at least one particle-trapping structure in accordance with some embodiments.

As another example, co-pending U.S. patent application Ser. No. 15/908,685, which is incorporated by reference, discloses a segmented structure 120 that is disposed at or near the base of a vertical structure of a slider 525 and generally follows at least a portion of the base of the vertical structure. As described in U.S. patent application Ser. No. 15/908,685, a segmented structure 120 comprises a plurality of (i.e., at least two) particle-trapping segments 125 and at least one gap 130 disposed between each pair of adjacent particle-trapping segments 125. FIG. 7 illustrates a slider 525E that includes a segmented structure 120 adjacent to the base of the leading pad 605 and two particle-trapping structures 200A and 200B adjacent to the bases, respectively, of the side pads 595A and 595B. Slider embodiments incorporating both a segmented structure 120 near the leading edge 575 and particle-trapping structures 200 closer to the trailing edge 570 may be particularly advantageous to mitigate the deleterious effects of particles in a variety of operating environments, including lower-pressure environments such as sealed helium hard disk drives.

Figure 8:
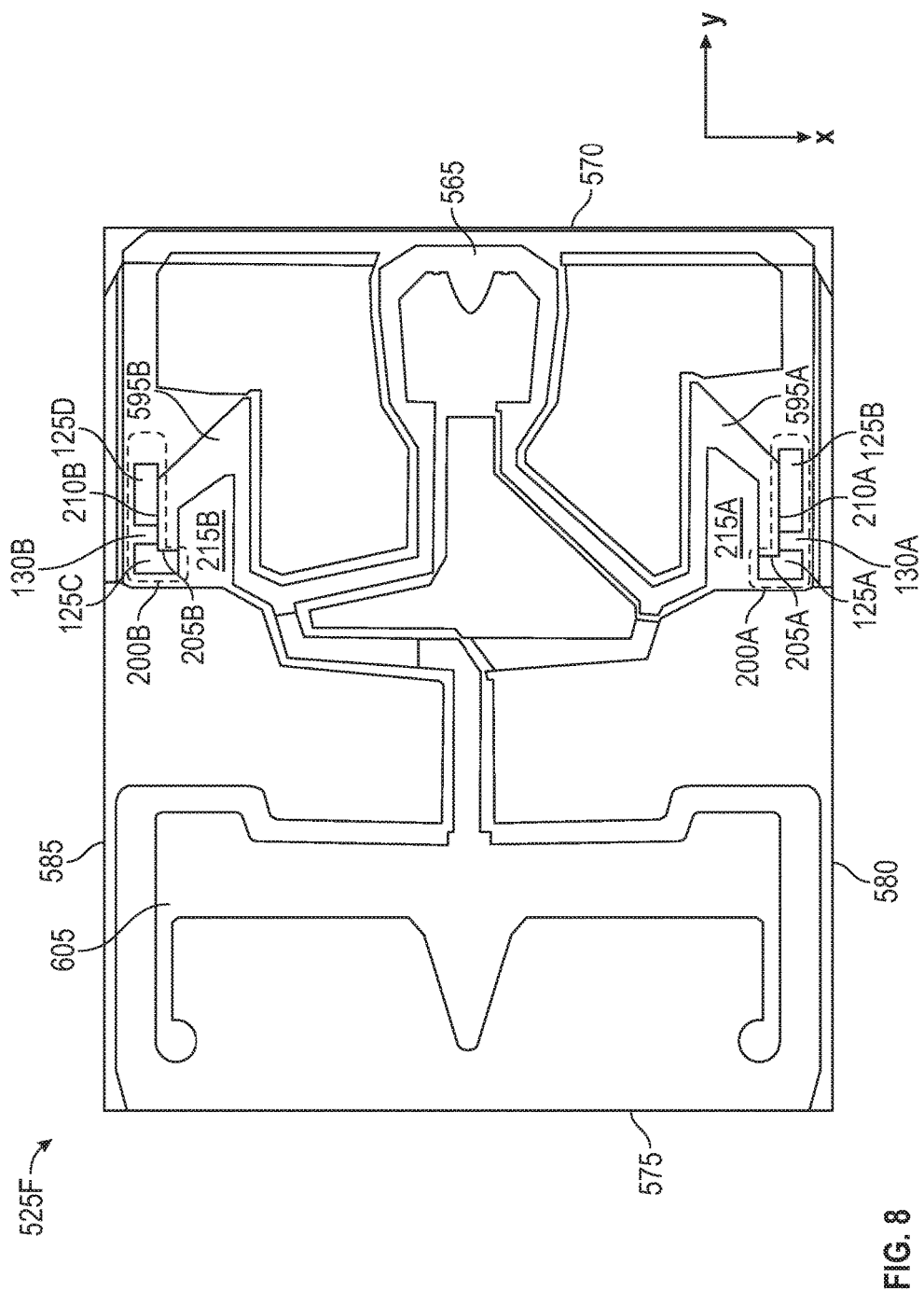
FIG. 8 illustrates an exemplary slider with a particle-trapping structure comprising a segmented structure in accordance with some embodiments.

In some embodiments, one or more particle-trapping structures 200 include or are themselves segmented structures 120, such as disclosed in U.S. patent application Ser. No. 15/908,685, which is incorporated by reference. FIG. 8 illustrates an exemplary slider 525F in which the particle-trapping structures 200A and 200B comprise, respectively, segmented structures 120A, 120B. Each of the exemplary segmented structures 120A, 120B shown in FIG. 8 includes two particle-trapping segments 125 and one gap 130. Each of the one or more gaps 130 is at a respective level, which is at or below the level of the base of the vertical structure. The segmented structure 120A includes the particle-trapping segments 125A, 125B and the gap 130A disposed between the particle-trapping segments 125A and 125B, and the segmented structure 120B includes particle-trapping segments 125C, 125D and the gap 130B disposed between the particle-trapping segments 125C and 125D. As illustrated by the embodiment shown in FIG. 8, in some embodiments in which the slider 525 includes more than one particle-trapping structure 200, and more than one of the particle-trapping structures 200 are segmented structures 120, the different segmented structures 120 have characteristics (e.g., shapes, sizes, footprints in the x-y plane, floors 227, walls 228, etc.) that are similar or substantially identical. In some other embodiments in which the slider 525 includes more than one particle-trapping structure 200, and more than one of the particle-trapping structures 200 are segmented structures 120, the different segmented structures 120 have characteristics (e.g., shapes, sizes, footprints in the x-y plane, floors 227, walls 228, etc.) that differ.

FIG. 8 illustrates each of the segmented structures 120A, 120B having two particle-trapping segments 125 and one gap 130 disposed between the particle trapping segments 125. It is to be understood that when a particle-trapping structure 200 is or includes a segmented structure 120, that segmented structure 120 may include more than two particle-trapping segments 125 and more than one gap 130. U.S. patent application Ser. No. 15/908,685 describes segmented structures 120 in detail, and those disclosures are applicable herein.

FIGS. 5A, 6, 7, and 8 illustrate particle-trapping structures 200A, 200B that have similarly-shaped footprints in the x-y plane, but it is to be understood that different particle-trapping structures 200 may have different sizes and/or shapes. As will be appreciated by skilled artisans, along with the other characteristics of particle-trapping structure 200, the size and shape of the footprint of each particle-trapping structure 200 in the x-y plane may be designed to provide the desired particle-trapping capabilities.

Conventionally, a slider 525 is fabricated from a wafer using a photolithography process having two steps: (a) covering a portion of a surface of the wafer, and (b) removing substrate material from the exposed (i.e., not covered) surface of the wafer. Step (a) may be accomplished, for example, using a binary mask having hard edges to create a well-defined pattern in a photoresist layer that is applied to the wafer surface. Step (b) may be accomplished, for example, by lapping, etching, or milling (e.g., using an ion beam) to transfer the photoresist pattern to the wafer surface. The surface of the slider 525 to which the covering is applied and from which material is removed is the surface that will eventually face the disk 520 when the slider 525 is used in a disk drive 500, i.e., the ABS 550. The steps (a) and (b) may be repeated multiple times to create different slider features.

In some embodiments, the particle-trapping structures 200 disclosed herein may be fabricated using conventional techniques. Specifically, the particle-trapping structures 200 may be etched out by milling (e.g., deep ion milling) using the steps (a) and (b) discussed above. The use of conventional slider fabrication techniques may be desirable to add a particle-trapping structure 200 to a slider without increasing its manufacturing cost or complexity. Other fabrication techniques may be used instead or in addition to fabricate more complex or different types of particle-trapping structures 200 (e.g., to create particle-trapping structures 200 having walls 228 with protrusions, cavities, or crevices). For example, U.S. Pat. No. 9,865,284 discloses methods for manufacturing sliders using additive fabrication techniques (e.g., three-dimensional (3D) printing, stereo lithography, fused deposition modeling, selective laser sintering, multi jet modeling, etc.) to form slider features. These methods and techniques may be used to create a slider 525 having a particle-trapping structure 200 as disclosed herein. The contents of U.S. Pat. No. 9,865,284 are hereby incorporated by reference in their entirety.

It is to be understood that the particle-trapping structures 200 shown in drawings herein are merely exemplary, and the particle-trapping structures 200 may have different and myriad footprints in the x-y plane. Likewise, the illustrated characteristics of the floors 227, walls 228 (if present), and other features of particle-trapping structures 200 are merely exemplary. In general, and as discussed above, the particle-trapping structures 200 may have any characteristics that provide the desired particle-trapping capabilities.

It is also to be understood that although the drawings herein illustrate particle-trapping structures 200 with footprints in the x-y plane that have perimeters with linear segments, the footprint of a particle-trapping structure 200 in the x-y plane need not have a perimeter of linear segments. In some embodiments, a particle-trapping structure 200 has a shape with a least one curve in the footprint (e.g., the particle-trapping structure 200 footprint in the x-y plane may include a curve, may be partially or fully elliptical, oval, irregular, etc.).

Moreover, although the drawings illustrate the particle-trapping structures 200A, 200B abutting vertical structures (namely, the side pads 595A, 595B), in general, a particle-trapping structure 200 may be offset from a vertical structure.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

As set forth herein, as used to describe the relative positions of different layers of a slider ABS, the terms "above," "below," "higher," and "lower" are used assuming that the ABS of the slider is facing up.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A slider, comprising:
a leading edge;
a trailing edge;
a leading-edge structure located between the leading edge and the trailing edge;
a vertical structure located between the leading-edge structure and the trailing edge, the vertical structure having a leading-edge-facing surface and a side-edgefacing surface, the vertical structure having a base at a first level of an air-bearing surface (ABS) of the slider; and a particle-trapping structure adjacent to the base of the vertical structure, the particle-trapping structure having a first portion adjacent to the leading-edge-facing surface and a second portion adjacent to the side-edge-facing surface, wherein the particle-trapping structure comprises at least one cavity extending below the first level when the ABS is oriented upward.

2. The slider recited in claim 1, wherein the particle-trapping structure abuts the base of the vertical structure.

3. The slider recited in claim 1, wherein the first portion and the second portion intersect.

4. The slider recited in claim 1, wherein a footprint of the particle-trapping structure is L-shaped.

5. The slider recited in claim 1, wherein a depth of the first portion differs from a depth of the second portion.

6. The slider recited in claim 1, wherein a depth of the first portion is substantially the same as a depth of the second portion.

7. The slider recited in claim 1, wherein a floor of the particle-trapping structure is non-uniform.

8. The slider recited in claim 1, wherein at least a portion of a floor of the particle-trapping structure is substantially flat.

9. The slider recited in claim 1, wherein the vertical structure is a side pad.

10. The slider recited in claim 1, wherein the particle-trapping structure is a first particle-trapping structure, and the at least one cavity is a first at least one cavity, and further comprising a second particle-trapping structure adjacent to a base of the leading-edge structure, wherein the second particle-trapping structure comprises a second at least one cavity extending below the first level.

11. The slider recited in claim 10, wherein a depth of the first particle-trapping structure and a depth of the second particle-trapping structure are substantially identical.

12. The slider recited in claim 10, wherein a depth of the first particle-trapping structure differs from a depth of the second particle-trapping structure.

13. The slider recited in claim 10, wherein the second particle-trapping structure comprises a segmented structure.

14. A data storage device comprising the slider recited in claim 13.

15. The slider recited in claim 1, wherein the vertical structure is a first vertical structure, the leading-edge-facing surface is a first leading-edge-facing surface, the side-edge-facing surface is a first side-edge-facing surface, the particle-trapping structure is a first particle-trapping structure, and the at least one cavity is a first at least one cavity, and further comprising:

a second vertical structure with a second leading-edge-facing surface and a second side-edge-facing surface, the second vertical structure having a base at a second level of the ABS, wherein the second level is the same as or different from the first level; and a second particle-trapping structure adjacent to a base of the second vertical structure, the second particle-trapping structure having a first portion adjacent to the second leading-edge-facing surface and a second portion adjacent to the second side-edge-facing surface, wherein the second particle-trapping structure comprises a second at least one cavity extending below the second level.

16. The slider recited in claim 15, wherein the second vertical structure is located between the leading-edge structure and the trailing edge.

17. The slider recited in claim 15, wherein a depth of the first particle-trapping structure and a depth of the second particle-trapping structure are substantially identical.

18. The slider recited in claim 15, wherein a depth of the first particle-trapping structure differs from a depth of the second particle-trapping structure.

19. The slider recited in claim 15, wherein a footprint of the first particle-trapping structure and a footprint of the second particle-trapping structure are substantially similar.

20. The slider recited in claim 15, wherein a footprint of the first particle-trapping structure differs from a footprint of the second particle-trapping structure.

21. The slider recited in claim 1, wherein the particle-trapping structure comprises a segmented structure, the segmented structure comprising at least a first particle trapping segment, a second particle-trapping segment, and a gap disposed between the first and second particle-trapping segments, wherein, when the ABS of the slider is oriented upward:

a level of the first particle-trapping segment is below the first level;
a level of the second particle-trapping segment is below the first level;
a level of the gap is at or below the first level; and
the level of the first particle-trapping segment and the level of the second particle-trapping segment are below the level of the gap.

22. A data storage device comprising the slider recited in claim 1.

* * * * *